(12) United States Patent
Hansen, incapacitated et al.

(10) Patent No.: US 6,589,461 B2
(45) Date of Patent: Jul. 8, 2003

(54) METHOD OF MAKING A TREATMENT CHEMICAL CARTRIDGE

(76) Inventors: Austin C. Hansen, incapacitated, 445 Forest Dr., late of Atlanta, GA (US) 30342; by Christopher Conrad Hansen, legal representative, 740 Ashcreek Ct., Roswell, GA (US) 30075

( * ) Notice: Subject to any disclaimer, the term of this patent is extended or adjusted under 35 U.S.C. 154(b) by 212 days.

(21) Appl. No.: 09/725,588

(22) Filed: Nov. 29, 2000

(65) Prior Publication Data

US 2001/0001511 A1 May 24, 2001

Related U.S. Application Data

(63) Continuation-in-part of application No. 09/442,935, filed on Nov. 18, 1999.

(51) Int. Cl.$^7$ .................... B29C 39/24; B29C 39/38; B29C 67/20
(52) U.S. Cl. ............ 264/109; 264/345; 252/176; 210/697; 210/501
(58) Field of Search .................... 264/109, 319, 264/345; 210/198.1, 501, 697; 252/175, 176, 177, 178, 179, 180, 181

(56) References Cited

U.S. PATENT DOCUMENTS

| | | | | |
|---|---|---|---|---|
| 1,252,872 A | | 1/1918 | Yoggerst et al. | |
| 2,135,932 A | | 11/1938 | Belmont | |
| 2,955,923 A | | 10/1960 | Atkinson | 23/272 |
| 3,306,709 A | | 2/1967 | Atkinson | 23/272 |
| 3,442,800 A | | 5/1969 | Jasionowski | 210/57 |
| 3,443,590 A | | 5/1969 | Wagner et al. | 137/604 |
| 3,476,137 A | | 11/1969 | Eisendrath | 137/268 |
| 3,668,132 A | * | 6/1972 | Finder | 134/2 |
| 3,887,468 A | | 6/1975 | Bray | 210/206 |
| 4,059,522 A | | 11/1977 | Polley et al. | 210/198 R |
| 4,216,027 A | * | 8/1980 | Wages | 4/227.7 |
| 4,281,421 A | * | 8/1981 | Nyquist et al. | 252/187.25 |
| 4,347,224 A | | 8/1982 | Beckert et al. | 422/277 |
| 4,434,136 A | * | 2/1984 | Wilkinson et al. | 134/93 |
| 4,452,713 A | * | 6/1984 | Small | 210/697 |
| 4,531,659 A | | 7/1985 | Wright | 222/189 |
| 4,673,527 A | * | 6/1987 | Goudy et al. | 252/175 |
| 4,680,124 A | * | 7/1987 | Young et al. | 210/697 |
| 4,780,197 A | | 10/1988 | Schuman | 210/136 |
| 4,876,003 A | * | 10/1989 | Casberg | 206/5 |
| 5,053,206 A | | 10/1991 | Maglio et al. | 422/264 |
| 5,078,301 A | * | 1/1992 | Gladfelter et al. | 222/52 |
| 5,181,533 A | | 1/1993 | Kooi | 137/268 |
| 5,443,569 A | | 8/1995 | Uehira et al. | 222/190 |
| 5,462,208 A | | 10/1995 | Stahley et al. | 222/207 |
| 5,507,108 A | * | 4/1996 | Bruggink et al. | 210/282 |
| 5,507,945 A | | 4/1996 | Hansen | 210/198.1 |
| 5,580,448 A | | 12/1996 | Brandreth, III | 210/206 |
| 5,648,033 A | * | 7/1997 | Bogue et al. | 264/109 |
| 5,709,880 A | * | 1/1998 | Del Corral et al. | 210/735 |
| 6,063,289 A | * | 5/2000 | Failon et al. | 210/699 |
| 6,391,207 B1 | * | 5/2002 | Cluyse | 210/699 |

* cited by examiner

Primary Examiner—Angela Ortiz
(74) Attorney, Agent, or Firm—Fitch, Even, Tabin & Flannery

(57) ABSTRACT

A method of producing a polyphosphate, orthophosphate, phosphonate or the like chemical treatment cake is disclosed. Conventional commercially available treatment material is obtained in powder form and mixed with water to initiate an exothermic reaction. The material is then poured into a mold and placed inside an insulated hermetic cabinet and allowed to quiescently cool in the passive environment of the cabinet. The cake is harder, more uniform and relatively free of inclusions compared to cakes formed by other methods.

8 Claims, 2 Drawing Sheets

METHOD OF MAKING A TREATMENT CHEMICAL CARTRIDGE

CROSS REFERENCE TO RELATED APPLICATION

This is a continuation-in-part of U.S. patent application Ser. No. 09/442,935 filed Nov. 18, 1999.

BACKGROUND OF THE INVENTION

1. Field of the Invention

The present invention pertains to the chemical treatment of liquids, such as water for food processing and other uses.

2. Description of the Related Art

Many commercial and residential water supplies suffer from "hard water" and other objectionable conditions. In various types of commercial activities, such as produce handling, food stores and restaurants, the available domestic water supply is employed to carry out commercial operations. Remedial measures to address problems of corrosion and scaling, are sometimes carried out with the introduction of small amounts of a treatment chemical, such as polyphosphate or sodium silicate, into the domestic water supply.

A liquid treatment apparatus as described in commonly assigned U.S. Pat. No. 5,507,945 has proven commercially successful, particularly in the treatment of water supplies used for food preparation and other applications. The liquid treatment apparatus provides a chemical treatment agent which is put into solution and mixed with water flowing through the apparatus. More particularly, the liquid treatment apparatus includes a dispense head which develops a venturi action which is applied so as to help meter relatively small amounts of treatment chemical in the fluid flow. The liquid treatment apparatus includes, in addition to the aforementioned dispense head, a canister which threadingly engages the dispense head and which receives a container holding the chemical agent. Provision is made for joining the liquid treatment apparatus to a piping system. In operation, the canister is unthreaded from the dispensing head to allow replenishment of the chemical treating agent, provided in the form of a solid cake. While the chemical treatment apparatus has been met with widespread commercial acceptance, it is desirable to provide low cost alternative systems which are readily deployed by operators who are not familiar with dispenser and fluid metering technologies.

U.S. Pat. No. 5,580,448 discloses a chemical dispenser having a cartridge, used either alone or with an outer surrounding filter sleeve. The cartridge includes an apertured mid-section located between an upper solid wall conduit segment and a lower chemical-containing cartridge member which includes a dispensing aperture at its upper end. Thus, the amount of chemical treatment agent which can be provided, is reduced by the amount of the combined volume of the solid wall conduit segment and the apertured mid-section.

SUMMARY OF THE INVENTION

It is an object of the present invention to provide a treatment chemical suitable for introduction in relatively small amounts into a water supply.

Another object of the present invention is to provide a treatment chemical which can be readily metered into a water flow using conventional apparatus.

A further object of the present invention is to provide an improved method of manufacturing a treatment chemical in a solid, cake-like form.

Yet another object of the present invention is to provide a method which provides an orthophosphate, a phosphonate or the like water treatment chemical in a cake form having improved hardness, which resists disintegration under operational pressures and flows.

Yet another object of the present invention is to provide more rapid methods of manufacturing chemical treatment cakes of the above-described type.

These and other objects of the present invention are provided in a method of making a solid cake which is soluble in a dispensing device for dispensing a metered amount of treatment chemical into a water flow, comprising the steps of:

obtaining conventional polyphosphate, orthophosphate or phosphonate powder adapted to be mixed with water to form a solid;

mixing the powder with water to initiate an exothermic reaction and form a mixture having a temperature of at least approximately 120° F.;

pouring the mixture in a mold vessel;

providing a cabinet defining a hollow interior;

placing the mold vessel within the cabinet;

maintaining the mixture within the cabinet so as to allow the temperature and humidity of the mixture to smoothly, continuously decay during transition of the mixture to a liquified solid form; and removing the mold vessel from the cabinet after a sufficient amount of time has passed to allow the mixture to form a solid cake.

DETAILED DESCRIPTION OF THE PREFERRED EMBODIMENTS

Figure 1:
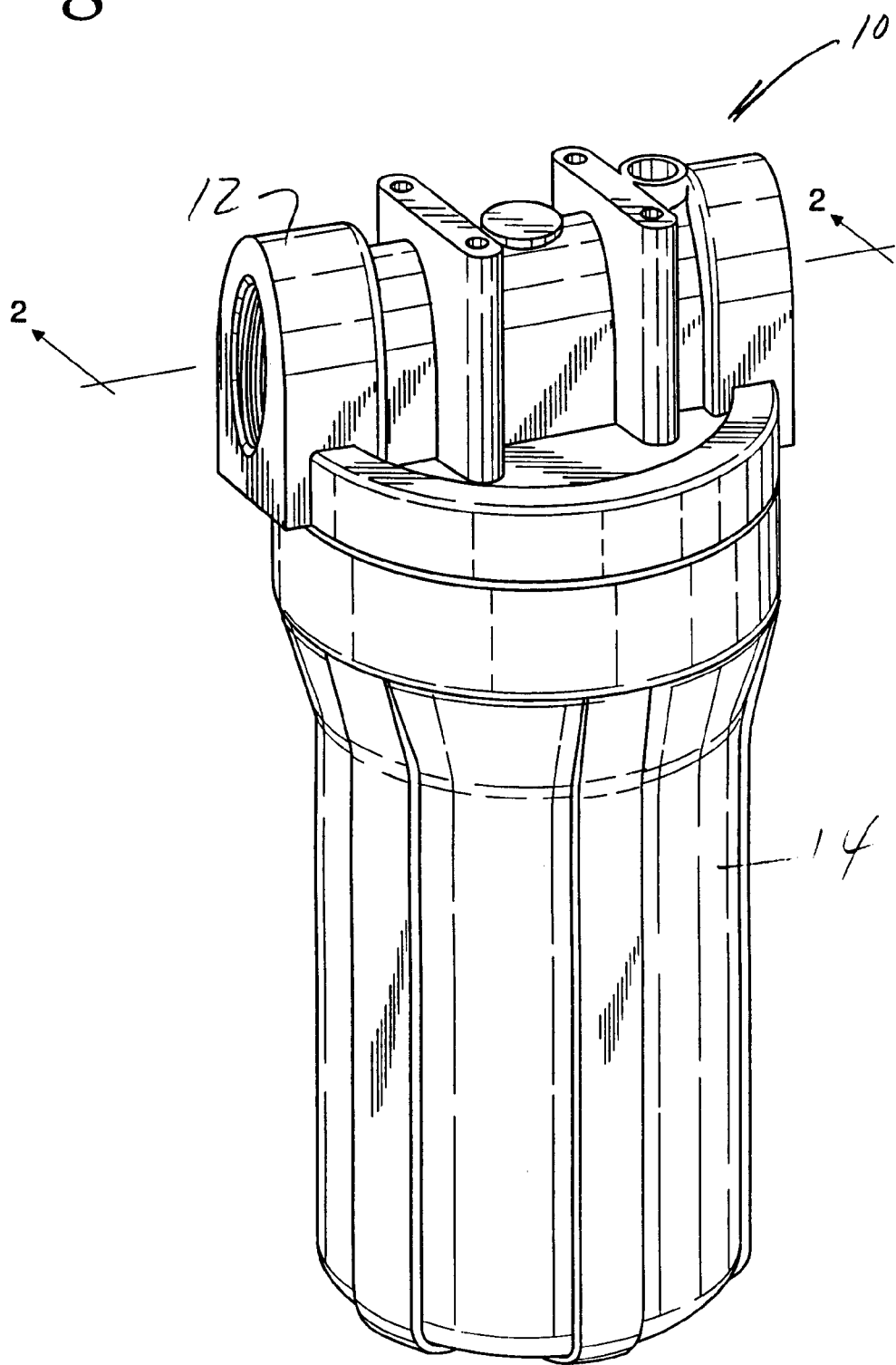
FIG. 1 is a perspective view of chemical dispensing apparatus of a type to which the present invention is directed.

Referring now to the figures, a device for dispensing treatment chemical prepared according to principles of the present invention is generally indicated at 10. The dispensing device 10 comprises a fluid-tight, preferably pressure-tight vessel including a dispense head 12 and a sump or canister 14. As can be seen, for example in FIG. 2, the dispense head and canister have interfitting threaded portions 16, 18, respectively. A conventional O-ring seal 20 is the preferred mode of providing leak-free joinder of the dispense head and canister.

Figure 2:
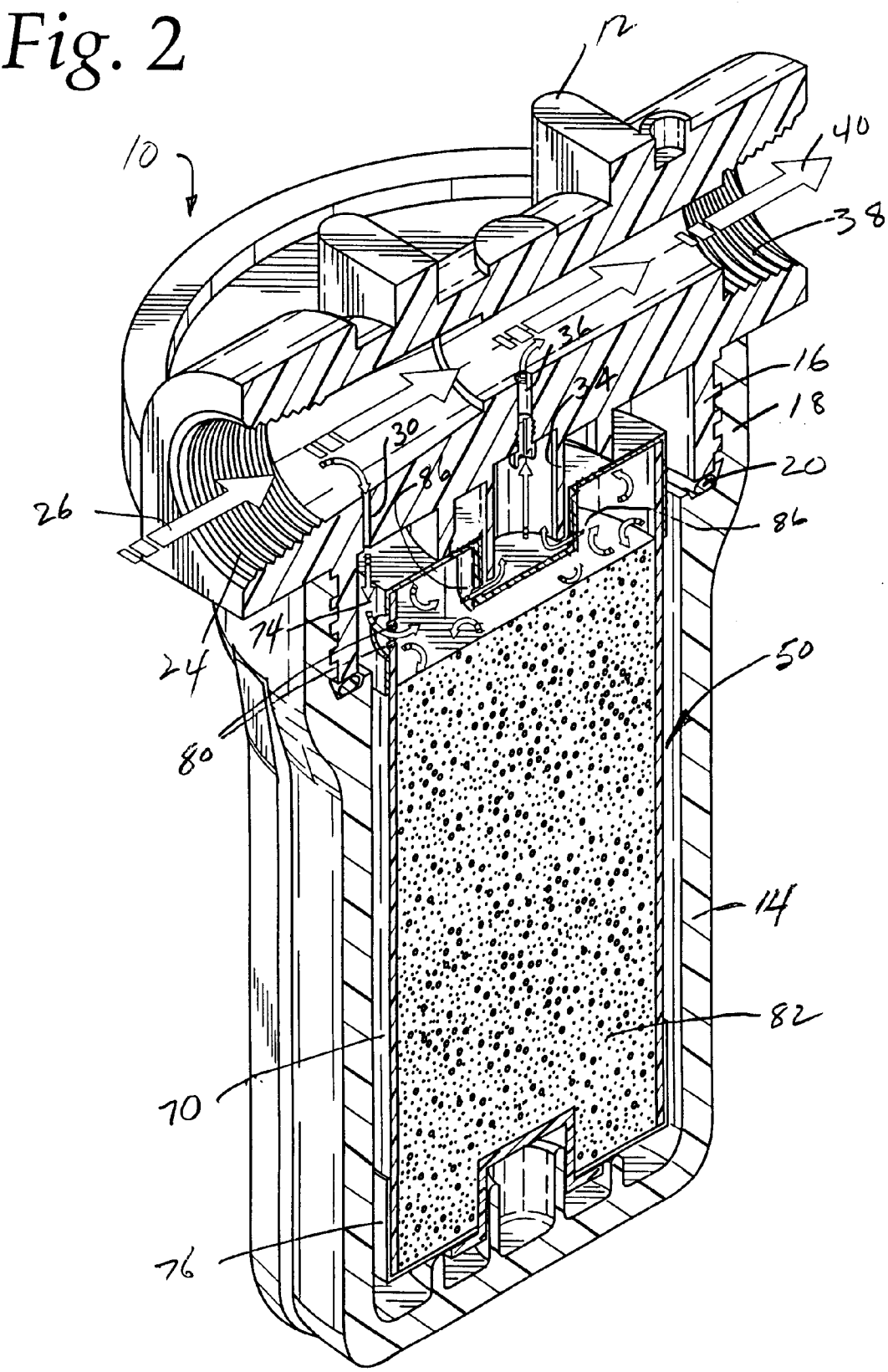
FIG. 2 is a cross-sectional view taken along the line 2—2 of FIG. 1.

Referring to FIG. 2, the dispense head 12 has a monolithic molded plastic design. An inlet 24, preferably threaded, accepts a pressurized fluid flow indicated by the arrow 26. A portion of the incoming flow is diverted by internal passageway or opening 30 into the interior of the canister 14. The incoming flow fills the upper end of canister 14 and eventually exits through a flow exit means in the form of a stub portion or projection 34, through outlet passageway 36 and eventually travels to threaded outlet opening 38, as indicated by arrow 40. As can be seen in FIG. 2, the projection 34 comprises a stub-like nipple projecting slightly beyond the bottom wall of dispense head 12 into the hollow cavity of canister 14.

Dispense head 12 can take on configurations other than the pre-filter type of dispenser illustrated in the figures. For example, metering accuracies previously associated with venturi-type dispensing heads can now be enjoyed with dispensing heads of a simplified pre-filter type. The present invention provides improved flow regulation for dispensing devices which are pressure-induced, rather than relying on the suction effects of venturi flow, as in earlier designs. The chemical cartridge or insert prepared according to the present invention may also be used with dispensing devices of the venturi flow type, such as those disclosed in commonly assigned U.S. Pat. No. 5,507,945, which is herein incorporated by reference.

The assembly of dispensing device 10 is completed with the introduction of a chemical cartridge or insert generally indicated at 50. Preferably, the chemical cartridge 50 includes a hollow tubular plastic casing 70 enclosed at its upper and lower ends by end caps 74, 76, respectively. The upper end cap 74 has a large hole exposing one or more holes 80 formed in tubular body 70. Preferably, the holes 80 are aligned generally parallel to a central axis of the chemical container. Holes 80 allow introduction of surrounding fluids to enter the interior of casing 70, so as to contact the treatment chemical 82, provided in the form of a solid cake. The treatment chemical 82 is dissolved by water filling the interior of canister 14 and entering the chemical container through holes 80. The dissolved treatment chemical passes through outlet holes 86 formed in the end of cap 74, so as to combine with the outlet fluid flow indicated by arrow 40.

According to the present invention, chemical treatment cakes having improved properties are manufactured from conventional commonly available powdered materials in a fraction (up to approximately one-third) the time required for carrying out prior art methods. The chemical treatment cakes are preferably molded in the form of cartridges used in dispensing apparatus for the treatment of water supplies such as those used in restaurants and produce displays. The chemical treatment cakes are made from polyphosphonate or orthophosphate powdered materials and the like. One example of carrying out the present invention will be described with reference to powdered materials commercially available from Calciquest Inc., 181 Woodlawn Avenue, Belmont, N.C. under the trade designation CALFG-097E CQ DRY. The composition of this mixture is proprietary, although it is believed that the mixture, at least in substantial part, comprises a polyphosphonate material The present invention contemplates the use of powdered materials mixed with phosphonate, water or other fluid components at a pre-selected ratio determined by the manufacturer to initiate an exothermic reaction. The preferred powdered material referred to above is mixed with phosphonate at a ratio of 3 parts powdered material to 1 part phosphonate blended or otherwise mixed to form a mixture resembling a slurry that self-generates an internal heating that continues at a decaying rate for a substantial amount of time. The mixture is poured in one or more molds comprising plastic canisters of the type shown in U.S. Pat. No. 5,507,945. In one commercial embodiment, the plastic canisters are formed by a hollow plastic tube approximately five inches long and two and one-half inches in diameter. One end of the plastic tube is closed by a plastic end cap to form a fluid-tight vessel. The mixture is poured into the plastic canister and placed in a holding cabinet which provides thermal and moisture insulation and hermetic sealing for the mixture, isolating the mixture from ambient air currents, thus providing a continuously quiescent environment for the mixture during the cool down period in which the mixture cures, transitioning from a liquid state to a monolithic block-like solid state. The enclosure need not be rigorously air-tight must provide an environment for quiescent cool down of the freshly blended mixture.

Upon blending, the preferred mixture referred to above exhibits an exothermic reaction, with the temperature of the mixture rising above 120° F. The temperature of the mixture is monitored to determine passage of a temperature peak, before the mixture is placed in the holding cabinet. As a preferred method, the mixture temperature is allowed to peak and then fall to 120° F., a process which takes only several minutes after blending. The mixture, contained in the plastic canisters, is then placed within the holding cabinet. For example, in a typical operation, eight canisters 2.5 inches in diameter and 5 inches in height are placed in a holding cabinet measuring 16¾ inches wide, 19¾ inches long and 21½ inches in diameter. Throughout the subsequent cool down period, the holding cabinet is closed so as to provide the described quiescence of temperature, moisture and air currents during curing or cool-down of the mixture.

Canisters of different proportions (i.e., aspect ratios) are contemplated by the present invention. It is preferred, however, that the canisters have a diameter or cross-sectional upper opening which is approximately equal to or less than the height of the canisters. The mixtures in the canisters have been observed to cool and subsequently harden, when placed in a quiescent environment, from the bottom to the top. With open top canisters according to the present invention, the heat concentration boundary travels toward the open top during cool-down. At the end of an approximate eight hour period, the entire mixture within the canisters is observed to fully solidify into a unitary, monolithic block. A cap is then placed to cover the upper end of the canisters, forming a chemical cartridge, such as that indicated at 50.

Unlike prior art non-quiescently formed chemical treatment cakes, treatment cakes produced according to the present invention are found to be remarkably more uniform, non-porous, harder, relatively impervious to crumbling, being virtually free of voids, inclusions, with greatly reduced friability and frangibility. Further, chemical treatment cakes produced according to the present invention remain solid (i.e., do not break up) during dissolution, even when subjected to a flowing water supply, including domestic water supplies experiencing water hammer conditions. Accordingly, chemical treatment cakes according to principles of the present invention provide improved metering in that the cakes resist shedding particles which would otherwise be entrained in (i.e., added to) the treated water flow.

According to one prior art method, mixtures are so-called "cold formed". Typically, the mixtures are poured in molds and allowed to cool in the ambient production environment, releasing their heat and moisture to a virtually infinite temperature and moisture sink. The cure time, i.e., the time to fully solidify such mixtures for similarly sized canisters, requires approximately 24 hours. Not only is the cure or cool-down time substantially extended, the resulting chemical treatment cake produced in the non-quiescent open system production environment is less uniform, remarkably softer, and more friable and frangible than chemical treatment cakes according to principles of the present invention. Although not fully understood at this time, it is believed that the air-related, temperature-related and humidity-related quiescently decayed cool-down period provided by the present invention, increases the crystal size and extent of crystallographic cross-linking in a beneficial way that substantially reduces the tendency of the resulting chemical treatment cake to exhibit inclusions, friability, frangibility and the like mechanical weakness, while substantially increasing the homogeneity and controlled dissolution needed for highly accurate metering.

One advantage of chemical treatment cakes according to principles of the present invention, is that the cakes can be cast in a longer, bulk form and subsequently sawn to length as required. Improved mechanical properties of chemical treatment cakes according to principles of the present invention permits such sawing without unusual, expensive handling techniques.

According to principles of the present invention, the mixture is placed in a holding cabinet which provides a quiescent cool-down or cure during which the elevated initial temperature and humidity levels of the mixture are allowed to decay at a controlled, undisturbed, continuous rate and the thermal boundary is allowed to smoothly rise to the vessel top. According to principles of the present invention, the holding cabinet provides quiescence with respect to temperature, humidity, and air currents or other disturbances which improves the solidification of the mixture into a remarkably uniform non-porous hardened crystallized solid.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A method of making a solid cake which is soluble in a dispensing device for dispensing a metered amount of treatment chemical into a water flow comprising the steps of:

obtaining polyphosphate, orthophosphate or phosphonate powder adapted to be mixed with water to form a solid;

mixing the powder with a fluid component to initiate an exothermic reaction and form a mixture having a temperature of at least approximately 120° F.;

pouring the mixture in a mold vessel;

allowing the freshly combined mixture to pass a temperature maximum, cooling to a temperature substantially above ambient;

providing an enclosure defining a hollow interior;

placing the mold vessel within the enclosure;

maintaining the mixture within the enclosure so as to allow the temperature and humidity of the mixture to smoothly, continuously decay during transition of the mixture to a liquified solid form; and removing the mold vessel from the enclosure after a sufficient amount of time has passed to allow the mixture to form a solid cake.

2. The method of claim 1 wherein said maintaining step comprises hermetically and thermally sealing the enclosure interior.

3. The method of claim 1 wherein said fluid component comprises water.

4. The method of claim 1 wherein said fluid component comprises phosphonate material.

5. The method of claim 1 wherein said enclosure passively maintains the temperature and humidity environment within its hollow interior without employing an external energy source to drive the temperature and humidity values of the mixture away from their inherent values arising from the exothermic reaction.

6. The method of claim 1 wherein curing of the mixture into a solid form is completed within eight to nine hours.

7. The method of claim 1 wherein said step of providing a mold vessel comprises the steps of providing a hollow cylindrical tube, providing a bottom end cap and seating the bottom end cap on one end of the tube to enclose the bottom end of the tube thereby forming a fluid-tight vessel.

8. The method of claim 7 further comprising the step of providing a top end cap and fitting the top end cap to the top end of the tube upon removal of the mold vessel from the cabinet so as to enclose the solid cake.

* * * * *

UNITED STATES PATENT AND TRADEMARK OFFICE
CERTIFICATE OF CORRECTION

PATENT NO. : 6,589,461 B2
APPLICATION NO. : 09/725588
DATED : July 8, 2003
INVENTOR(S) : Austin C. Hansen Page 1 of 1

It is certified that error appears in the above-identified patent and that said Letters Patent is hereby corrected as shown below:

On the Title page item (76) Inventors, line 3: delete "Christopher" and insert --Cris-- therefor.

Signed and Sealed this

Twenty-third Day of September, 2008

JON W. DUDAS
*Director of the United States Patent and Trademark Office*